INVENTOR.
FRIEDRICH BIEDERMANN
HELMUT DÜRR
ERWIN v. WASIELEWSKI
HELMUT MAYR
HANS-PETER HUBER
JOSEF GANSER
RICHARD PELTE

INVENTOR.
FRIEDRICH BIEDERMANN
HELMUT DÜRR
ERWIN v. WASIELEWSKI
HELMUT MAYR
HANS-PETER HUBER
JOSEF GANSER
RICHARD PELTE

United States Patent Office 3,483,807
Patented Dec. 16, 1969

3,483,807
PHOTOGRAPHIC CAMERA WITH AN ELECTRO-MAGNETICALLY OPERABLE LENS DIAPHRAGM
Friedrich Biedermann, Unterhaching, and Helmut Duerr, Erwin von Wasielewski, Helmut Mayr, Hans-Peter Huber, Josef Ganser, and Richard Pelte, Munich, Germany, assignors to Agfa-Gevaert Aktiengesellschaft, Leverkusen, Germany
Filed Nov. 17, 1966, Ser. No. 595,086
Claims priority, application Germany, Nov. 23, 1965, A 50,844
Int. Cl. G01j 1/00, 1/52
U.S. Cl. 95—10                                                    20 Claims

ABSTRACT OF THE DISCLOSURE

One or more blades of the diaphragm in a photographic camera are oscillated by armatures of electromagnets at an amplitude which is a multiple of a lens stop so that the blades define an aperture whose size is a function of such oscillatory movement. The circuit of electromagnets includes photoelectric transducer means so that the aperture size is a function of scene brightness.

---

The invention relates to a photographic camera, more specifically to a cinematographic camera, having at least one electromagnetically operable lens diaghragm for controlling the diaphragm openings.

Arrangements of this type for controlling the diaphragm openings are widely known. All of them however have the disadvantage that as a consequence of the static positioning of the diaphragm the possibility is not always excluded that the diaphragm may get stuck during comparatively small changeovers. In other cases, the rotating coil instruments which are customarily used for positioning the diaphragm must be dampened in order to prevent hunting of the diaphragm blades. Consequently, the requirements have to be observed which for rotating coil instruments must necessarily be quite steep; on the other hand, no guarantee is given for precise control due to necessity of having to use comparatively large forces for overcoming adhesive friction.

In order to overcome these difficulties, the size of the diaphragm opening, in accordance with the invention is determined by means of a vibratory medium which is capable of undergoing a periodic oscillation corresponding in amplitude to at least several lens stops and which is operable by at least one electromagnet.

Such an arrangement makes it almost impossible that a sticking of the vibrating medium will occur; the dynamic positioning of the diaphragm also makes unnecessary the use of an expensive rotary coil instrument.

In accordance with an embodiment of the invention one or more of the electromagnets are supplied from an alternating current source which includes a photoelectric transducer responsive to the exposure light, preferably comprising a photoresistance. It is thus possible to obtain a light-dependent control of the exciting alternating current potential. More specifically, the alternating current potential source for the purpose of modulating its amplitude in response to light may be connected in series with the photoresistance. If, due to the mechanical construction of the diaphragm it be necessary that the amplitude modulation be inversely proportional to the light, the photoresistance may be in parallel circuit with the winding of one or more of the electromagnets. The exciting alternating current potential in the magnet coil in that case will decrease with increasing brightness so that the amplitude of the vibrating medium will also decrease.

In accordance with another embodiment of the invention there is provided, for the purpose of generating an alternating current potential with a light dependent frequency, an astable multivibrator with two transistors, and two capacitors respectively arranged between the base of one and the collector of the other transistor, to the base of which there is applied a light responsive direct current potential. In addition it is proposed that a photoresistance is respectively arranged between the direct current potential and the bases of each of the transistors. It is also proposed for the purpose of adjustment and for the conrol of film sensitivity to provide adjustment resistances in parallel and/or in series with the photoresistances as well as adjustment capacitors in parallel circuit with respect to the main capacitors.

Such a multivibrator uses very little current and is capable of being arranged within the camera without any trouble.

In accordance with one embodiment of the invention, there are provided at least two vibrating media which are operable by means of a corresponding number of electromagnets and the exciting alternating potentials of which are shifted in respect to their phase relation in dependence of the light incident on the photoresistance. The lens stop and thereby the volume of the exposure light entering therethrough will decrease according to the illumination of the photoelectric transducer by way of a corresponding phase shift with increasing light volume. For a minimal phase angle the diaphragm aperture attains a maximum, while with a phase angle of 180° the diaphragm opening attains a minimum value. Since only a phase shift of the exciting current takes place, the correct relationship of the two movements is always maintained.

In accordance with another embodiment of the invention a shutter which periodically interrupts the exposure light which for instance may comprise a rotary diaphragm, and the vibrating medium for determining the lens stop operate with the same frequency, a light reseponsive phase shifter being provided for shifting the phase of the alternating current potentials controlling both the shutter and the vibrating medium. In this form, the periodically acting shutter which ordinarily may be a rotating diaphragm, may be firmly coupled with other mechanical portions of the camera, for instance with the film transport, since the phase relation of this potential may remain unchanged.

A phase shifter in accordance with the invention comprises a combination of an astable multivibrator, the duty cycle relationship of which is light dependent due to the use of a photoresistance and two monostable multivibrators, the output of the astable multivibrator being fed by way of a differentiating circuit such as a capacitor or a transducer to two diodes which serve to conduct the positive pulses to one and the negative pulses to the other of the monostable multivibrators. Such a phase shifter requires such a small current and space that it may be disposed very easily within the normal camera.

In another embodiment of the invention, the frequency source may comprise a mechanical oscillator otherwise known from electronic clocks which includes a permanent magnet and coacts with a control coil the means for controlling the size of the lens stop being secured to the mechanical oscillator which preferably constitutes a tuning fork-like element. A frequency source of this tvre exhibits a constant frequency characteristic independent of the load which is important for cinematic cameras.

The means for controlling the size of the lens stop, preferably comprising diaphragms blades, may in the rest position be arranged to interrupt the exposure light path, the photoresistance being in parallel circuit with the exciter coil. Such an arrangement for cinematographic camera makes a rotating shutter unnecessary in order to periodically interrupt the exposure light path which is necessary for the film transport action.

In accordance with a further embodiment the frequency source may comprise a speed controlled direct current motor which may operate the rotary shutter, an alternating current generator and an interruptor in the supply circuit of the direct current for the various magnets. It is therefore possible to utilize the motor customarily used in a motion picture camera for operating the rotary shutter in a somewhat larger size, as a source for a precisely synchronized alternating current potential or a chopped direct current potential.

In a still further embodiment of the invention the photoelectric transducer may be disposed in the exposure light path behind the rotary shutter or may be arranged in a light path bent by means of a mirror arranged on the rotary shutter.

A control is thereby obtained since the photo current is controlled in its amplitude by the light volume, in its frequency by that of the rotary shutter and in its phase by the position of the transducer with respect to the shutter opening.

In a further embodiment of the invention the duration of oscillation of the vibrating medium is equal to the light exposure time cycle of the camera. Since the actual light exposure time is always less than the period of illumination cycle, the light exposure period may be arranged to occur within the period of the maximum diaphragm excursion so that a very high exploitation of the exposure light may be obtained. In other embodiments the oscillatory period of the vibrating medium may be smaller by at least a factor of 5 than the time of the illuminating cycle of the camera. The vibrating means, and particularly the diaphragm blades may be of especially light weight construction in order to make a high intrinsic frequency possible.

A still further embodiment provides a vibrating medium consisting of fixed flat spring members arranged to carry the individual diaphragm blades and which are individually controlled by magnets. With constant oscillating frequency, the incident light causes amplitude modulation to take place thus providing a measure for the incident light volume. In case of frequency modulation of the exciting alternating current potential, the oscillating amplitude of the diaphragm blades moves along the rising or descending portion of the resonance curve so that in accordance with the rest positions of the diaphragms either a direct or opposite relationship is obtained for the light dependent change in the diaphragm blade amplitude.

In still another embodiment of the invention, the vibrating medium consists of two fixed flat spring members under control of a common magnet. This construction is especially advantageous when these tongue-like flat springs are made of magnetic material, are magnetically connected like a magnetic yoke and are shaped in such a manner that, due to the action of a current which is applied to a winding mounted on the yoke, they attract one another. Since, in this manner, a magnetic circuit is formed having very small resistance, the effect of a comparatively small current becomes quite large.

In a further embodiment, a vibrating single diaphragm blade is provided which coacts with a stationary diaphragm blade whereby a further simplification may be obtained.

In still another embodiment there is provided a single vibrating medium, which is excited approximately in resonance from a frequency-modulated alternating current potential. The vibrating medium activates movable diaphragm blades which control the lens stop size, are pivotably supported and aperiodically dampened and which in their rest position define the smallest possible lens aperture. In this manner, and in spite of the dynamic positioning and the advantages connected therewith, there is obtained a diaphragm which is practically stationary during the illumination period resulting in high exploitation of the exposure period.

In the drawing, there is shown in

Figure 1:
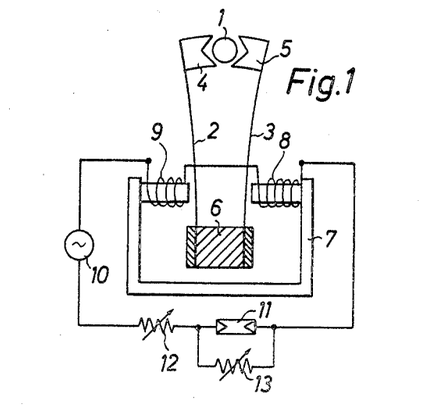
FIG. 1 an arrangement in accordance with the invention for the positioning of a lens stop aperture by means of an amplitude modulated exciting alternating current potential.

The arrangement shown in FIG. 1 serves to control a diaphragm aperture 1 by means of two vibrating diaphragm blades 4 and 5 supported by flexible tongue-like flat springs 2 and 3. Flat springs 2 and 3 are fastened in a block 6 and are exposed to the influence of a horseshoe magnet 7 which is excited by means of the two windings 8 and 9.

The circuit of the windings 8 and 9 includes in series therewith an alternating current generator 10 and a photoresistance 11 to which there are connected in series and in parallel circuit respectively adjusting resistors 12 and 13. The amount of illumination on the photoresistance 11 controls the amplitude of the alternating current derived from generator 10 in such a manner that increasing illumination also increases the vibration amplitude of springs 2 and 3. The control of the vibration amplitude on the effective diaphragm aperture, for instance in a cinematic camera, will be explained in further detail hereinbelow.

Figure 2:
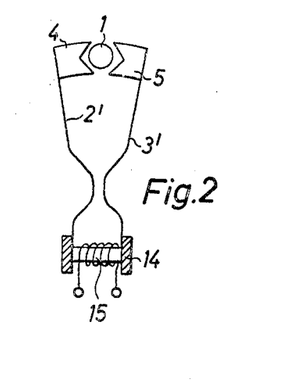
FIG. 2 an arrangement which comprises a simplification of that shown in FIG. 1 for the purpose of controlling a diaphragm aperture.

A modification of the arrangement shown in FIG. 1 is illustrated in FIG. 2. The flat springs 2' and 3' are mounted in a block 14 which also carries a single winding 15. The springs 2' and 3' are made of soft magnetic material and are bent so that they are attracted to each other when a current flows through the coil 15. The diaphragm blades 4 and 5 are subject to oscillation in accordance with corresponding modulation of the current in the winding 15.

Figure 3:
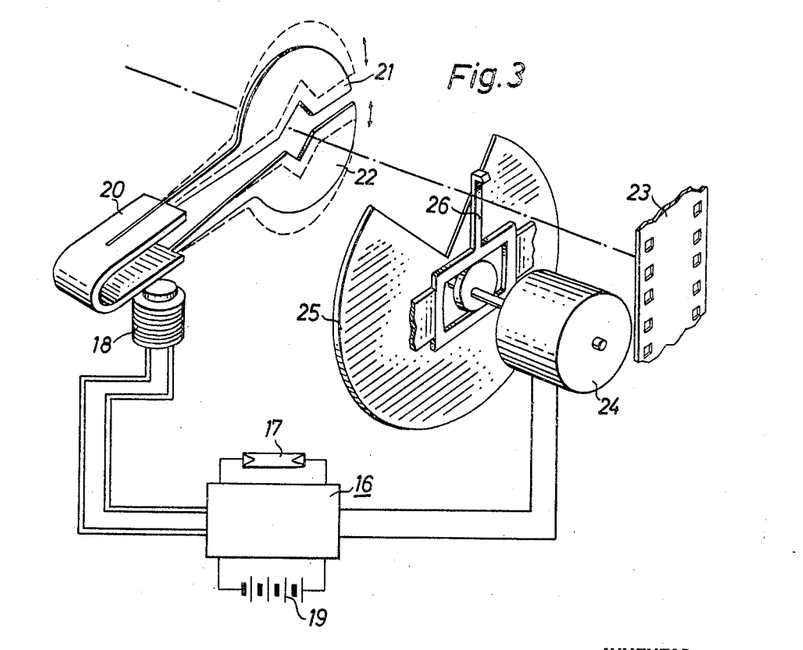
FIG. 3 a further embodiment for controlling a lens stop aperture by means of an amplitude modulated alternating current potential.

The control of the exposure period through the control of the amplitude of the diaphragm vibration is shown in FIG. 3 together with its relationship to the most important portions of a movie camera. An electronic oscillator circuit 16, the parts of which will be explained hereinbelow, is connected to a photoresistance 17 and a winding 18. The circuit 16 is supplied from a direct current potential source 19. The winding 18 produces a magnetic flux which acts on a U-shaped tuning fork vibrating frequency standard 20 consisting of magnetic material or including magnetic portions. Two blades 21 and 22 are secured to the two legs of the frequency standard which in accordance with their respective position determine the size of the entrance aperture for the exposure light path onto a photographic emulsion carrier 23.

The oscillator circuit is connected to a synchronous motor 24 which, due to its design, respectively makes a single turn during an oscillating period of the frequency standard 20. Motor 24 operates a rotating shutter 25 disposed in the exposure light path to the film 23, as well as an eccentrically driven claw 26 serving to move the film 23.

Figure 4:
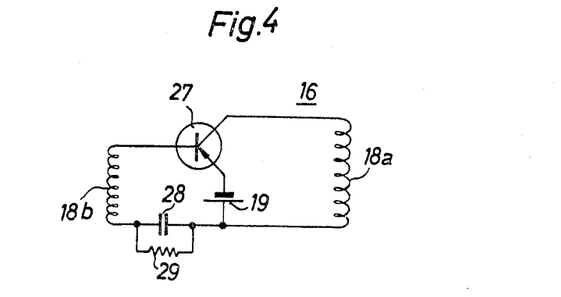
FIG. 4 the schematic of an oscillating circuit for vibrating diaphragms having a constant frequency.

The schematic circuit shown in FIG. 4 illustrates the electronic oscillator circuit 16. The circuit includes two coils comprising a primary or driver coil 18a and secondary or exciter coil 18b. The primary coil is connected with one terminal to the collector of a transistor 27 the emitter of which is connected to one pole of the direct current potential source 19. The other pole of the direct current potential source 19 is connected to the second terminal of the primary coil 18a. One terminal of the secondary coil 18b is connected to the base of transistor 27, and the other terminal of this coil is connected by way of a damping circuit including a capacitor 28 and a resistor 29 to the direct current potential source 19. Coils 18a and 18b are both disposed within the winding 18 as shown in FIG. 3.

Exciter circuits of this type are known for instance to have been used in electronic clocks. Their action is such that potentials induced in the secondary coil 18b by means of the vibrating frequency standard periodically render transistor 27 conductive. An alternating current of the same frequency, derived from the source 19, is thereby furnished to the driver coil 18a. The damping circuit including components 28 and 29 is provided in order to prevent an electrical feedback between the coils 18a and 18b.

Figure 5:
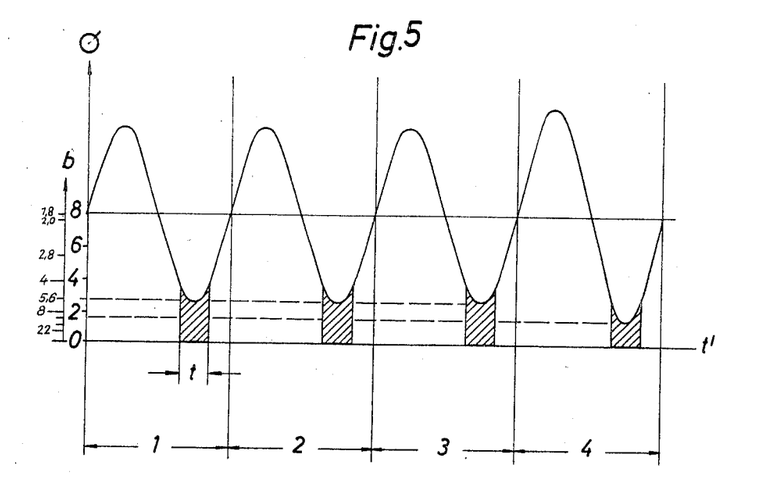
FIG. 5 the oscillation characteristic of an arrangement in accordance with FIG. 3.

The operation of the arrangement of FIG. 3 will now be explained with reference to the diagram shown in FIG. 5. Time $t$ is measured along the abscissa while the amplitude of vibration of the blades 21 and 22 is measured along the ordinate. Amplitudes have been given reference numerals corresponding to the diaphragm stop values which may be obtained thereby. The period of vibration corresponds to the resonant frequency of the oscillatory system including the spring members 21 and 22 and the frequency standard 20. The effect of the photoresistance 17, which for instance may be in series circuit with the primary coil 18a, is to cause a large vibration amplitude due to a large incident light volume. Thus for instance, an increase in brightness results in an increase of the amplitude as will be recognized by a comparison of the third and fourth cycles. If the rotating shutter 25 permits scene light to reach the emulsion carrier 23 only during the time period indicated in the cross hatched portions such cross hatched area corresponds respectively to the quantity of light incident on the film. As the amplitude of oscillation shown in FIG. 5 decreases due to a smaller brightness larger lens stops are obtained until finally, for very weak light the rest position of the vibrating spring members is reached resulting in a maximum aperture.

Figure 6:
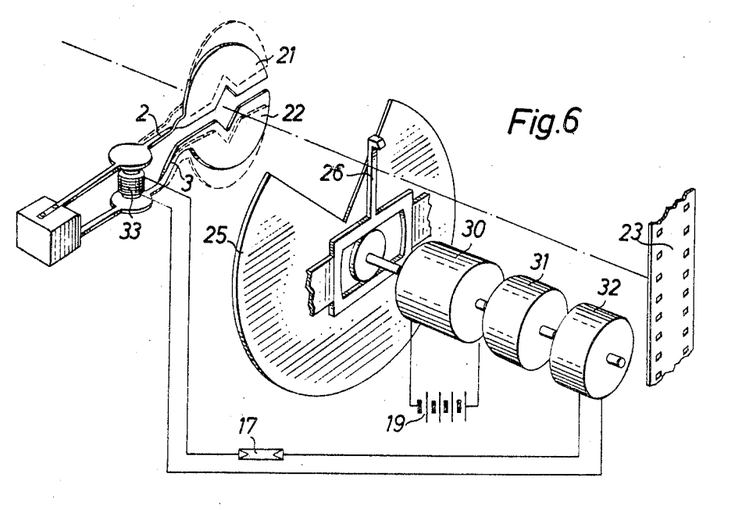
FIG. 6 an arrangement in accordance with the invention similar to that of FIG. 3 with a speed controlled motor as a source of frequency.

A modification of the arrangement of FIG. 3 is shown in FIG. 6. In place of an electronic oscillator circuit in connection with a mechanical frequency standard the source of frequency is provided by a direct current motor 30 energized from a battery 19. The speed control of the motor may for instance be obtained by means of a centrifugal force governor 31. The latter is not shown in greater detail since controls for the speed of cinematic cameras have been known for a long time. The motor 30 drives an alternating current generator 32 the output of which, as modulated by means of a photoresistance 17 in series circuit therewith is supplied to the windings of magnet 33. The magnet 33 ac's on the rigidly mounted spring members 2 and 3. Due to the firm coupling between motor 30 and generator 32, synchronization is assured between the shutter 25 and the diaphragm blades 21 and 22.

Figure 7:
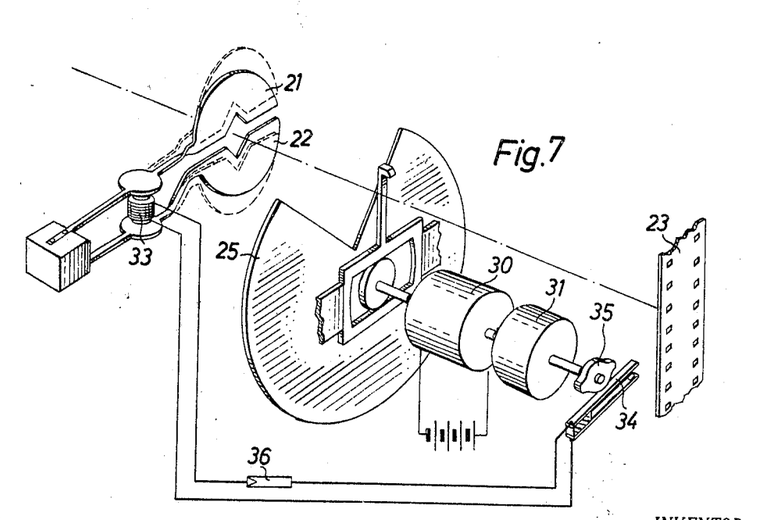
FIG. 7 a modification of the arrangement in accordance with FIG. 6.

A further modification is shown in FIG. 7. In place of an A-C generator, a switch 34 may be periodically closed by means of one or more cams 35 rotatably associated with the shutter shaft. The switch 34 controls the circuit of magnet 33 and of the photoelectric element 36.

A current due to the photoelectric element 36 will be caused to flow through magnet 33 due to the periodic activation of the switch 34 causing vibration of the diaphragm blades 21 and 22 synchronized with the rotation of shutter 25.

Figure 8:
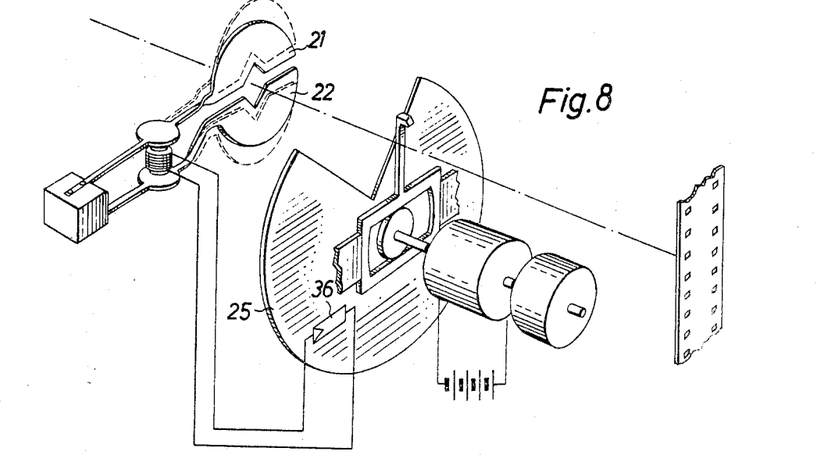
FIG. 8 a further modification of the arrangement of FIG. 6.

A modification of the arrangement of FIG. 6 is shown in FIG. 8. The coupling between the diaphragm blades 21 and 22 and the shutter 25 includes a photoelectric element 36 which is mounted behind the rotary shutter and is periodically illuminated. As a consequence a series of pulses is produced having an amplitude corresponding to brightness, causing a vibration of the diaphragm blades 21 and 22 having an amplitude corresponding to brightness.

Figure 9:
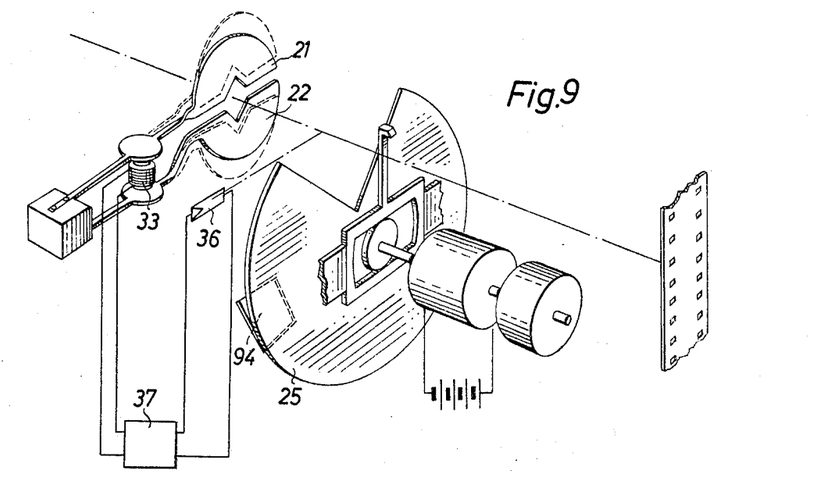
FIG. 9 a still further embodiment of the arrangement in accordance with FIG. 6.

A further variation is shown in FIG. 9 wherein a mirror 94 has been mounted on the rotary shutter 25 which is periodically brought into the path of scene light thus periodically supplying light to element 36 arranged in front of the rotary shutter. The periodic current obtained thereby is supplied to a magnetic winding 33 by way of the amplifier 37 causing oscillation of the diaphragm blades 21, 22 in correspondence with the current amplitude. This automatic exposure arrangement is self regulating since light reaching the photoelement has already passed through the controlled lens aperture.

In this arrangement an advantageous light control is realized by means of the objective lens since the angle of the light receiver changes with the focal length of the receiving objective. This is of special advantage in the case of zoom or adjustable lens objectives.

Figure 10:
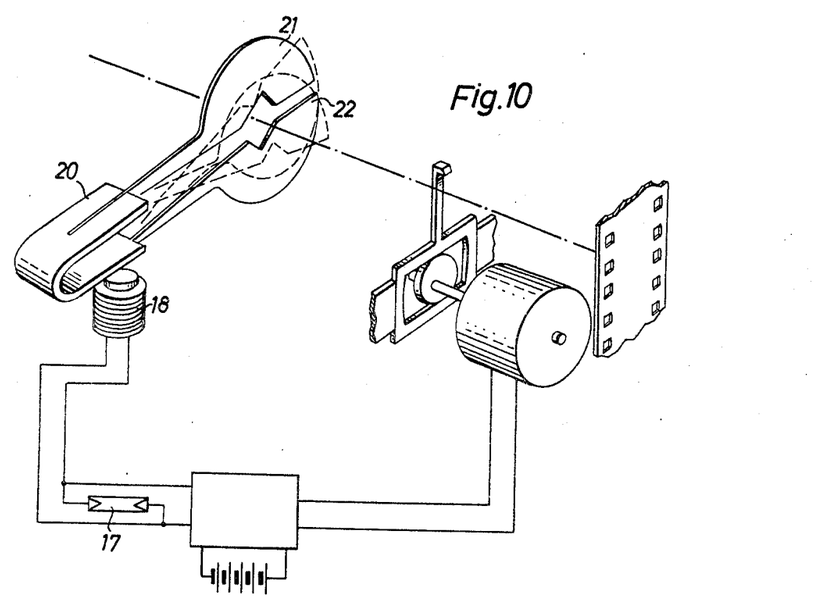
FIG. 10 a further modification of the arrangement of FIG. 3.

A further arrangement for controlling the effective lens aperture by means of vibrating diaphragm blades is shown in FIG. 10. The form here is such that the diaphragm blades 21 and 22 overlap when in rest position and thereby completely interrupt the radiation path. Whenever the frequency standard 20 is made to vibrate a diaphragm aperture is obtained for a short time which corresponds to the vibration amplitude. For this purpose it is necessary that the amplitude of the exciting alternating current potential change inversely to that of the applied brightness. This may be achieved by arranging the photoresistance 17 in parallel to the primary winding 18a. The rotary shutter thereby becomes superfluous. The use of an electromagnetically activated film transporting mechanism also makes a film driving motor unnecessary.

Figure 11:
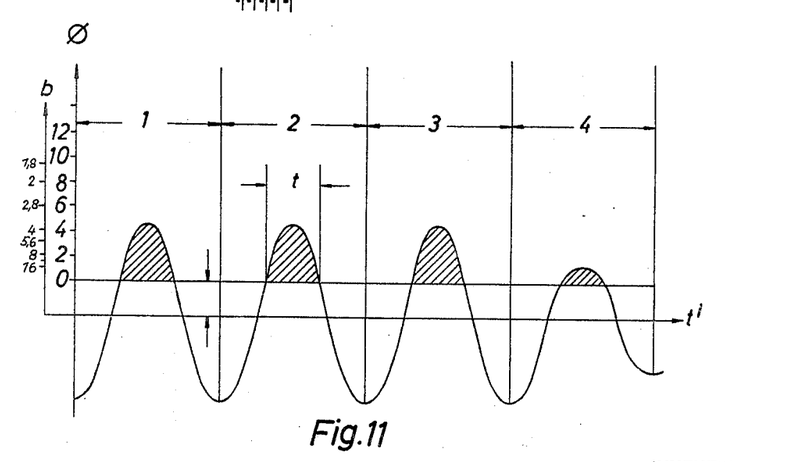
FIG. 11 the light responsive oscillation characteristic of the arrangement of FIG. 10.

FIG. 11 illustrates the radiation duty cycle for an arrangement in accordance with FIG. 10. Here the decrease in amplitude caused by a decrease in the exciter current illustrated in the fourth cycle also causes a decrease in the amount of light reaching the film.

Figure 12:
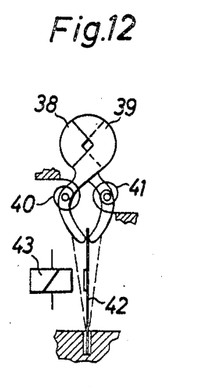
FIG. 12 an embodiment of a blade type diaphragm with a vibratory actuator element.

Another form for the control of lens apertures is shown in FIG. 12. Two diaphragm blades 38 and 39 are rotatably supported and by means of helical springs 40 and 41 are urged toward their rest position wherein they provide the smallest possible lens aperture. Positioned between the arms of the diaphragm blades 38 and 39 extending past their pivots, is a vibratory spring 42 which is rigidly fastened at its other end. An electromagnet 43 is arranged to act on the spring 42. The magnet 43 is supplied with an alternating current potential the amplitude of which changes in the opposite sense to that of the light intensity. The spring 42 is thus made to undergo high frequency oscillations having increasing amplitude with decreasing brightness and which serve to push apart the slow acting diaphragm blades 38 and 39 so that a practically stationary definition of the diaphragm opening is obtained. This arrangement therefore combines the advantage of a fixed lens stop with the advantage of a dynamic, that is an approximately friction-free lens aperture control.

Figure 13:
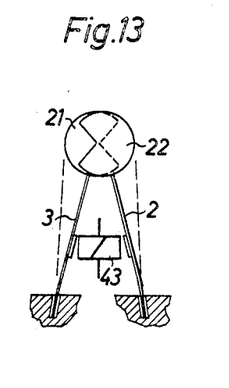
FIG. 13 a vibratory diaphragm with two oscillating blades.

FIG. 13 shows a diaphragm stop arrangement with two diaphragm blades 21 and 22, the flat springs 2 and 3 of which are rigidly mounted. As the electromagnet 43 is supplied with alternating current the frequency of which changes in correspondence with the light intensity, the oscillatory amplitude of the springs 2 and 3 is changed in accordance with the position of the exciting frequency relative to the resonant frequency of the oscillatory systems. By means of a corresponding change in the frequency of the alternating current an increased or decreased amplitude of the springs 2 and 3 may be obtained in that the diaphragm blades 21, 22 are caused to carry out at least five oscillations during an exposure cycle in order to minimize the error of integration.

It is possible, for instance, to observe the respective oscillating amplitude if an indicator which is associated with at least one of the diaphragm blades and can be made to appear in the viewfinder of the camera. The details of this modification however will not be further discussed. This has an especial advantage if a limit alarm is provided which would act as a warning that a further uncontrolled operation is no longer possible.

Figure 14:
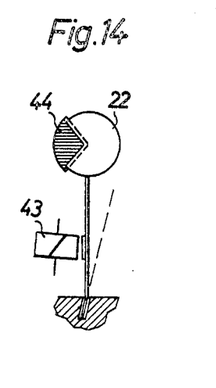
FIG. 14 a vibrating diaphragm with a single blade.

An arrangement similar to that of FIG. 13 is shown in FIG. 14 in which however only a single oscillating diaphragm blade 22 is provided which coacts with a stationary blade 44.

Figure 15:
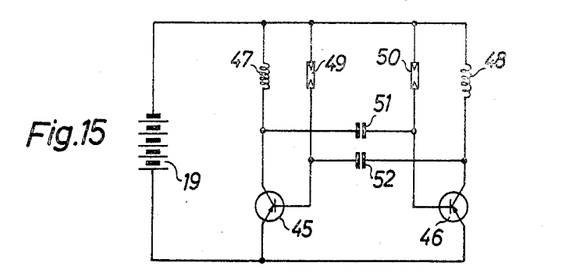
FIG. 15 a circuit schematic of the arrangement for a light responsive frequency modulation.

The circuit of a multivibrator in accordance with the invention is shown in FIG. 15; the frequency of this multivibrator is controlled as a function of light intensity. The emitter-collector paths of two transistors 45 and 46 are arranged in parallel circuit to each other and in series with a battery 19, the windings of the actuating magnets 47 and 48 being connected to their collectors. A photoresistance 49 is arranged between the base of the transistor 45 and the negative pole of the battery 19 while similarly a photoresistance 50 is connected to the base of transistor 46. Condenser 51 is connected between photoresistance 50 and the base of the transistor 46 at one side, and between the winding 47 and the collector of the transistor 45 on the other, while a capacitor 52 is similarly connected in respect to the base of the transistor 45 and the associated circuit elements.

If it becomes desirable to test the current amplitude supplied from the battery 19 suitable fixed resistances in place of the photoresistances 49 and 50 may be placed into the circuit by means of switches which may be activated by means of a test button. The oscillatory amplitude in correspondence to the battery potential and the fixed resistances may then be observed as explained in connection with FIG. 13.

Figure 16:
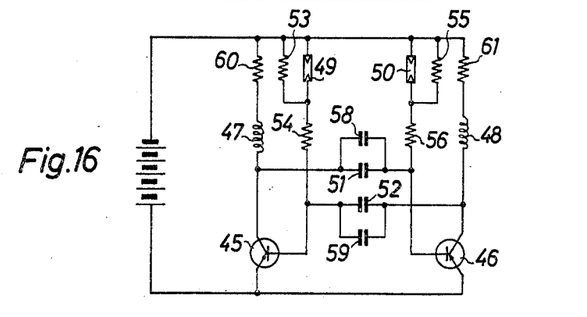
FIG. 16, a modification of the arrangement of FIG. 15.

FIG. 16 shows a modification of the circuit of FIG. 15 in this modified circuit, adjustment resistances 53, 54, 55 and 56 are provided for the photoresistances 49 and 50. Capacitors 51 and 52 are shown here with adjusting capacitors 58 and 59 and adjustment resistances 60 and 61 in series with the windings 47 and 48.

The operation of this circuit will be readily understood since it is known that astable multivibrators have a frequency characteristic which varies whenever the charging period of capacitors 51 and 52 is changed due to the changes in the resistance values of the photoresistances 49 and 50.

Figure 17:
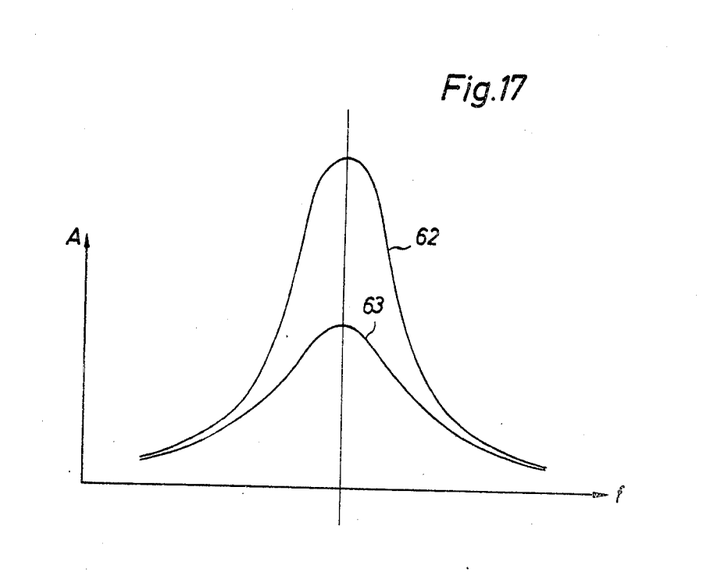
FIG. 17, the amplitude characteristic of the arrangement in accordance with FIG. 17 in relation to the exciter frequency.

FIG. 17 illustrates so-called resonance curves for the vibration amplitude, for instance, of the flat springs shown in FIG. 13 whenever the magnets are energized through a current which corresponds to the current through the coil 48. Small damping results in the curve 62 with steep flanks that is with a strongly light dependent amplitude and a somewhat greater damping of the diaphragm blades results in the somewhat flatter curve 63, that is, one wherein the light dependent amplitude variation is not so pronounced.

Figure 24:
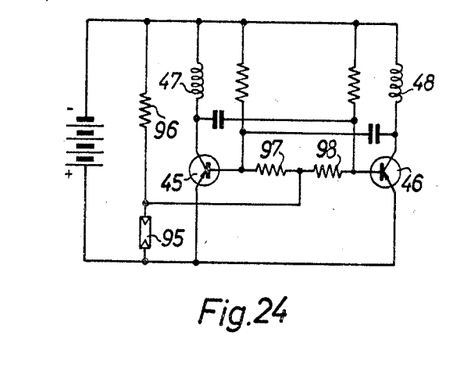
FIG. 24, a further modification of the arrangement of FIG. 15.

A further modification of the circuit of FIG. 15 is shown in FIG. 24. In this circuit, a light dependent potential is applied to the bases of the transistors 45 and 46 through resistors 97 and 98 with the aid of a single photoresistance 95 which, together with the fixed resistance 96, forms a voltage divider.

Figure 18:
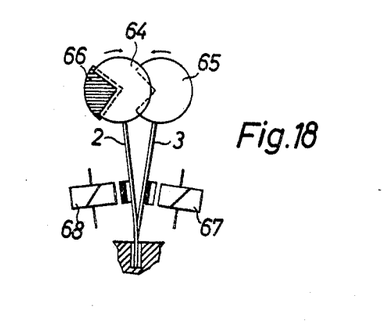
FIG. 18, of a vibrating diaphragm with two mechanically independent diaphragm blades oscillating in an opposite sense.

A further control arrangement is shown in FIG. 18, wherein two end fastened diaphragm blades 64 and 65 coact with a fixed diaphragm blade 66 and are subject to the influence of two separate electromagnets 67 and 68. The two magnets 67 and 68 are supplied with alternating current potentials of the same frequency which however have a predetermined phase difference. A minimally effective lens aperture is obtained for a phase difference of the currents of 180° while a phase coincidence of the two diaphragm blades brings about a maximum diaphragm aperture. In order to overcome any integrating errors, the oscillation period of the exciting alternating current should be smaller at least by a factor of 5 than the period of exposure to scene light. The fixed diaphragm blade 66 may be replaced by two oscillating spring arms which may move in phase respectively with the blades 64 or 65.

Figure 25:
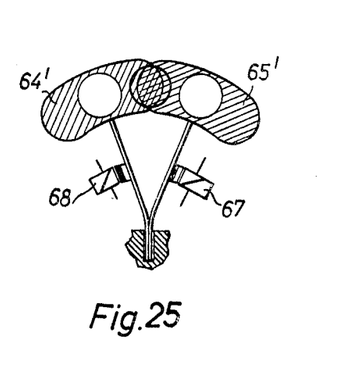
FIG. 25, a modification of the diaphragm arrangement shown in FIG. 18.

The spring mounted diaphragm members 64′ and 65′ having the form as shown in FIG. 25 also make it possible that the diaphragm springs may be operated without the fixed diaphragm member 66 or without springs which oscillate in phase therewith. A greater variation of the median diaphragm aperture is obtained in this case, since the deviation from the rest position in both directions acts to decrease the exposure to light.

This arrangement makes it possible that an amplitude control is superimposed on the phase control of the diaphragm blades in order to achieve a greater control range. One of the pairs of diaphragm blades vibrating in phase may be eliminated when amplitude control alone is used and the remaining diaphragm blades in their rest position act to interrupt the path of scene light.

Figure 19:
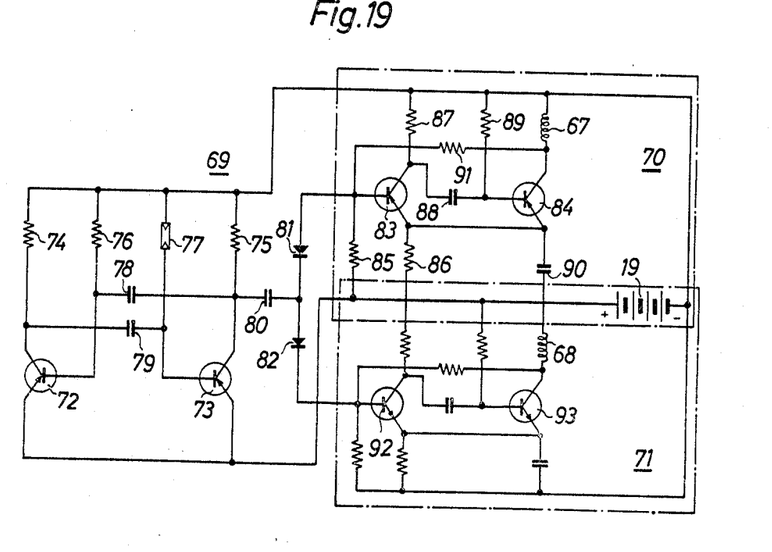
FIG. 19, a circuit schematic of a light responsive phase shifter.

The light responsive phase shifter for the supply for instance of magnets 67 and 68 is shown schematically in FIG. 19. Thhis phase shifter essentially consists of an astable multivibrator 69 and a differentiating circuit connected thereto, the positive output pulses of which are applied to a monostable multivibrator 70 by way of a rectifier, and the negative output pulses of which are applied to another monostable multivibrator 71 through an oppositely poled rectifier. The multivibrators 70 and 71 take the form of known circuits. More specifically, the astable multivibrator 69 comprises two transistors 72 and 73, the emitter-collector paths of which are connected to the terminals of a battery 19 by way of collector resistances 74 and 75. The base of the transistor 72 is connected to the negative terminal of the battery 19 by way of a base resistance 76. The base of the transistor 73 is connected to the negative pole of the battery by way of a photoresistance 77 which is exposed to scene light. A storage capacitor 78 is arranged between the base of the transistor 72 and the base resistance 76 on one side and between the collector resistance 75 and the collector of the transistor 73 on the other. A further capacitor 79 is connected similarly between the collector of the transistor 72 and the base of the transistor 73.

By means of changes in the resistance of the photoresistance 77, the duty cycle ratio, that is the ratio of the period during which current flows through transistor 73 to the period during which current flows through transistor 72 may be controlled in a known manner. The sum of the two periods, that is the period of the entire cycle, however, remains constant.

A capacitor 80 in circuit with the collector of transistor 73, acting as a differentiator, serves to "pulse" the conducting state of the astable multivibrator. As will be seen from FIG. 20, the result is that positive and negative pulses respectively appear at the other electrode of the capacitor 80 whenever the multivibrator is reversed. The positive and negative pulses are separately applied to the inputs of the two monostable multivibrators 70 and 71 through branches containing oppositely poled rectifiers, shown as diodes 81 and 82, respectively, in series with capacitor 80.

The monostable multivibrators 70, 71 are similar to each other. The multivibrator 70 comprises two transistors 83 and 84, the diode 81 being connected to the base of transistor 83. The base of transistor 83 is also connected to the positive pole of battery 19 by way of base resistance 85. The emitters of transistors 83 and 84 are also connected to the positive pole of battery 19 by way of a resistance 86. A load resistance 87 is provided between the collector of the transistor 83 and the negative pole of the battery. A capacitor 88 is disposed between the collector of the transistor 83 and the base of the transistor 84, the base of transistor 84 also being connected to the negative pole of the battery through resistor 89. A capacitor 90 is disposed between the positive pole of battery 19 and the emitter of the transistor 84 while the winding of the magnet 67 is connected between the collector of the transistor 84 and the negative pole of the battery. A resistor 91 is disposed between the base of the transistor 83 and the collector of the transistor 84.

The monostable multivibrator 71 is essentially similar. Its input, however, that is the base of the transistor 92 which is oppositely poled, is connected to the diode 82. The winding of the magnet 68 is disposed between the positive pole of the battery and the collector of transistor 93 which has complementary polarity to that of transistor 84.

Figure 20:
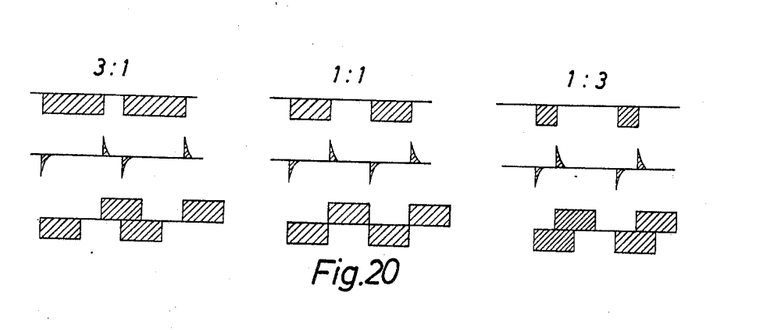
FIG. 20, the pulse characteristic derived from the circuit of FIG. 19.

The narrow pulses shown in the center line of FIG. 20 and which are conducted over the diodes 81 and 82 to the multivibrator 70 or 71 result in a conductivity changeover thereof in the corresponding directions. The duration of the current flow through magnets 67 and 68 is equal, its value being predetermined on the basis of the dimensions of the capacitors and resistances in the multivibrators. However, the impulses in the two magnets 67 and 68 are displaced in correspondence with the duration of the current impulses through the transistor 73. A light responsive phase shifter of this type is not only of use in connection with an electronic light exposure control but may also be used in many other technical fields.

Figure 21:
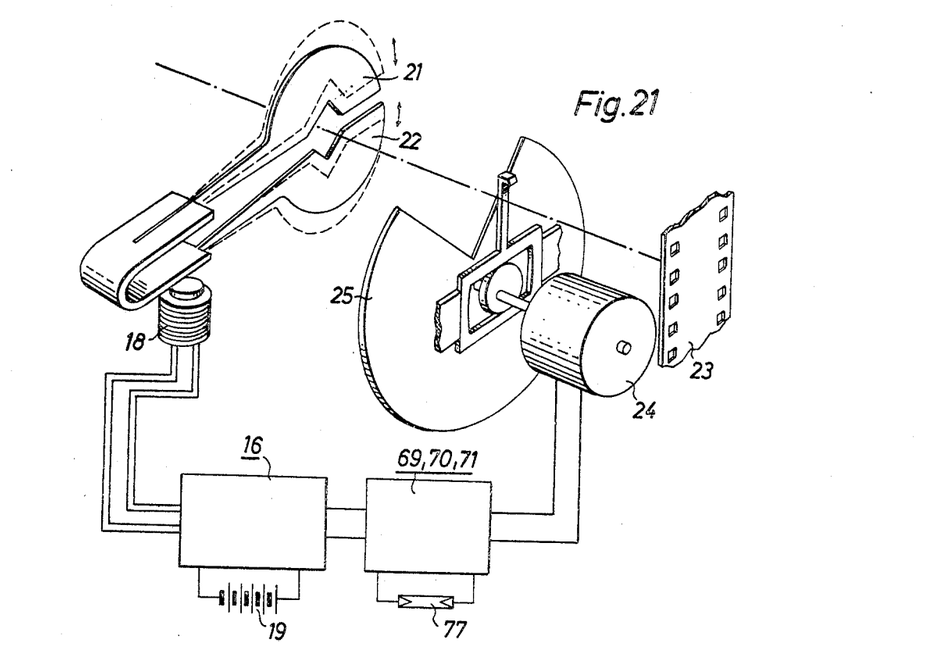
FIG. 21, a drawing showing the concept of an embodiment in accordance with the invention of diaphragm blades excited from an alternating current potential subject to a light responsive phase shift relative to the potential for the motor.

Electronic light radiation control by means of phase shifted alternating currents is not only possible in accordance with the arrangement of FIG. 18 in which the diaphragm blades 64 and 65 carry out at least five oscillations during a single light exposure period, but also as shown in FIG. 21, for instance, is usable in connection with a cinematic camera in which the oscillation of diaphragm blades 21 and 22 and a rotary shutter 25 operate with the same frequency. The difference, for instance, of the arrangement of FIG. 21 in respect to that of FIG. 3 is only the electronic phase shifter circuit 69, 70 and 71 which is shown in FIG. 19. This circuit is arranged between the electronic oscillator 16 and the motor 24 the winding of which, for instance, may be connected to the collector of transistor 84.

Figure 22:
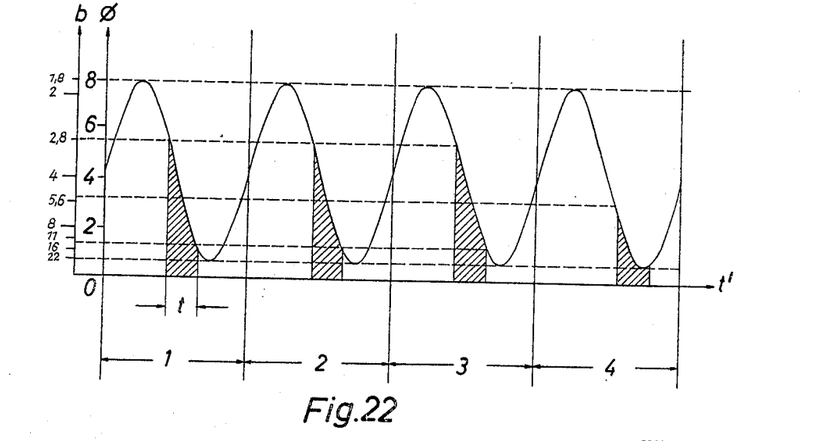
FIG. 22, the light exposure characteristic in an arrangement in accordance with FIG. 21.

The operation of the system of FIG. 21 may be understood from the showing of FIG. 22. The rotating shutter 25 limits the light exposure period to the hatched region as shown in FIG. 21. The diaphragm blades in this case always vibrate with the same amplitude. However, the light exposure period defined by the rotating shutter 25 is shifted in respect to the diaphragm oscillation according to the light amplitude incident on photoresistance 77. The light dependent phase shift between the oscillation of the diaphragm blades 21 and 22 which are controlled through the magnet 18 and the winding of which for instance may be connected to the collector of transistor 93, and the phase position of the rotary shutter 25 as determined through the motor 24 is controlled by the light volume incident upon the film 23 as shown by the cross hatched region in FIG. 22.

Figure 23:
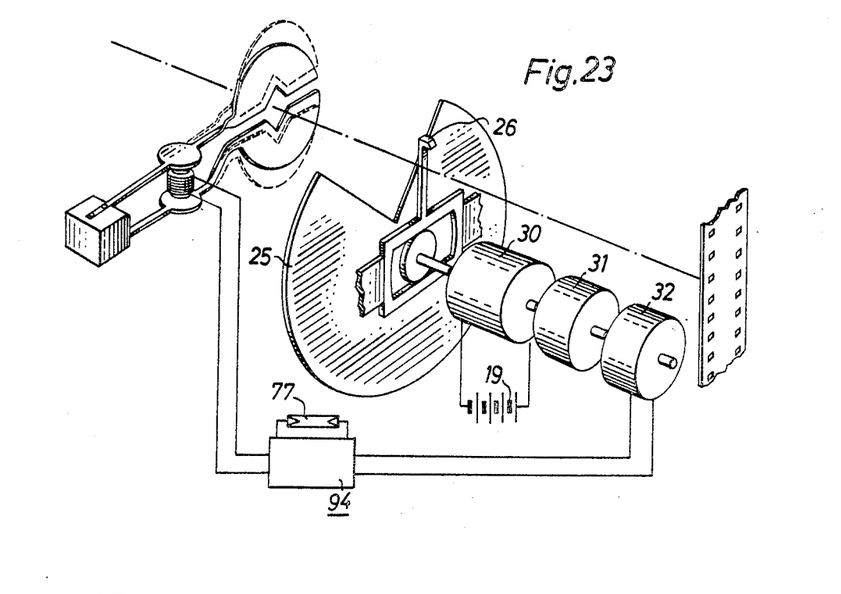
FIG. 23, a modification of the arrangement of FIG. 21.

A modification of the arrangemnt of FIG. 21 is shown in FIG. 23 wherein in a manner already described, the electronic oscillator 16 and the mechanical frequency standard are replaced by the speed controlled motor as a source of frequency which drives the alternating current generator 32. The electronic phase shifter circuit 94 with the photoresistance 77 may comprise the circuit as shown in FIG. 19.

It will be understood that various changes and modifications may be made in the above described embodiments without departing from the spirit of the invention as defined in the appended claims.

What is claimed as new and desired to be secured by Letters Patent is:

1. In a photographic camera, the combination comprising means for directing light toward a film within the camera, a shutter for controlling said light directing means, and vibrating means for dynamically defining a desired aperture with respect to said light directing means, said vibrating means including electromagnetic activating means, at least one source of pulsating potential for energizing said activating means, and a light responsive resistance element in circuit with said source and said activating means for modulating a characteristic of said pulsating potential in accordance with light amplitude whereby said dynamically defined aperture is made light dependent, said potential source including a circuit having a variable frequency and said light responsive resistance element forming a frequency control means in said variable frequency circuit.

2. A combination according to claim 1, wherein said vibrating means comprises a single member oscillating substantially at resonance, said electromagnetic means including a source of frequency modulated alternating potential for activation thereby, further including two pivotally supported, periodically dampened blades defining when at rest a minimum aperture therebetween, said single member forming means for effecting vibration of said dampened blades.

3. In a photographic camera, the combination comprising means for directing light toward a film within the camera, a shutter for controlling said light directing means, and vibrating means for controlling said light directing means for dynamically defining a desired aperture with respect to said light directing means, said vibrating means including electromagnetic activating means and two separate sources of pulsating potential for energizing said activating means, each of said sources having a light responsive resistance comprising a phase control therefor.

4. The combination according to claim 3, further including means for rotating said directing means controlling the shutter, said two sources having the same frequency, whereby said rotating shutter and said aperture controlling vibrating means are in synchronism and said pulsating potential sources are frequency shifted in response to light received by said light responsive resistances.

5. In a photographic camera, the combination comprising means for directing light toward a film within the camera, a shutter for controlling said light directing means, and vibrating means including electromagnetic activating means, at least one source of pulsating potential for energizing said activating means, and a light responsive resistance element in circuit with said source and said activating means for modulating a characteristic of said pulsating potential in accordance with light amplitude whereby said dynamically defined aperture is made light dependent, said source of pulsating potential comprising said resistance element, said shutter and means for rotating said shutter, said resistance element being periodically exposed to light by said shutter.

6. In a photographic camera, the combination comprising means for directing light toward a film within the camera, a shutter for controlling said light directing means and vibrating means for dynamically defining a desired aperture with respect to said light directing means, said vibrating means including electromagnetic activating means, at least one source of pulsating potential for energizing said activating means, and a light responsive resistance element in circuit with said source and said activating means for modulating a characteristic of said pulsating potential in accordance with light amplitude whereby said dynamically defined aperture is made light dependent, said source comprising said resistance element, said shutter, means for rotating said shutter and a light reflecting member on said shutter, said resistance element being periodically exposed to light deflected thereonto by said reflecting member.

7. In a photographic camera, the combination comprising means for directing light toward a film within the camera, a shutter for controlling said light directing means, and vibrating means for dynamically defining a desired aperture with respect to said light directing means, the oscillating period of said vibrating means being equal to the period of light exposure for the camera as determined by said shutter.

8. In a photographic camera, the combination comprising means for directing light toward a film within the camera, a shutter for controlling said light directing means, and vibrating means for dynamically defining a desired aperture with respect to said light directing means, the oscillating period of said vibrating means being smaller by a factor of five than the period of light exposure for the camera as determined by said shutter.

9. In a photographic camera, the combination comprising means for directing light toward a film within the camera, a shutter for controlling said light directing means, and vibrating means for dynamically defining a desired aperture with respect to said light directing means, said vibrating means including electromagnetic activating means and at least one source of pulsating potential for energizing said activating means, said source including a light responsive multivibrator circuit.

10. In a photographic camera, particularly in a motion picture camera, a combination comprising diaphragm means having an aperture adjustable within a range of sizes and including at least one blade arranged to perform vibratory movements which solely determine the amount of light passive through said aperture; vibrating means operatively connected with and arranged to effect vibratory movement of said blade at an amplitude corresponding to a multiple of a lens stop; and electromagnetic control means for varying at least one characteristic of said vibration which affects the shape thereof so as to thereby vary the vibration of said blade and consequently the amount of light passing through said aperture.

11. A combination as defined in claim 10, wherein said diaphragm means includes several oscillatable blades and said control means comprises a discrete electromagnet for each of said blades.

12. A combination as defined in claim 10, further comprising shutter means for periodically interrupting the path of light passing through the aperture of said diaphragm means and means for operating said shutter means at the frequency of said vibrating means.

13. A combination as defined in claim 10, wherein said control means comprises energizable electromagnet means and wherein the size of said aperture is zero in deenergized condition of said electromagnet means.

14. A combination as defined in claim 10, wherein said control means comprises electromagnet means and said vibrating means constitutes the armature of said electromagnet means.

15. A combination as defined in claim 10, wherein said control means comprises electromagnet means, a source of alternating current and photosensitive transducer means connected in circuit with said electromagnet means, said transducer means being exposed to scene light.

16. A combination as defined in claim 15, wherein said transducer means includes photoelectric resistor means.

17. A combination as defined in claim 15, wherein said current source is connected in series with said transducer means.

18. A combination as defined in claim 15, wherein said electromagnet means comprises winding means and said transducer means is connected in parallel with said winding means.

19. A combination as defined in claim 15, wherein said control means further comprises resistor means in circuit with said electromagnet means to influence vibratory movements of said blade independently of said transducer means.

20. A combination as defined in claim 15, wherein said source comprises astable multivibrator means including a pair of transistors and a pair of capacitors each connected between the collector of one of said transistors and the base of the other transistor, and a source of direct current connected with said transistors by way of said transducer means.

References Cited

UNITED STATES PATENTS

| 2,885,471 | 5/1959 | King | 352—141 XR |
| 3,003,096 | 10/1961 | DuBois | 318—20.48 XR |
| 3,205,569 | 9/1965 | Nerwin et al. | |
| 3,253,523 | 5/1966 | Hutchinson. | |

FOREIGN PATENTS 1,006,145   9/1965   Great Britain.

NORTON ANSHER, Primary Examiner

JOSEPH F. PETERS, JR., Assistant Examiner

U.S. Cl X.R.

95—64; 352—141; 318—21